Figure 1:
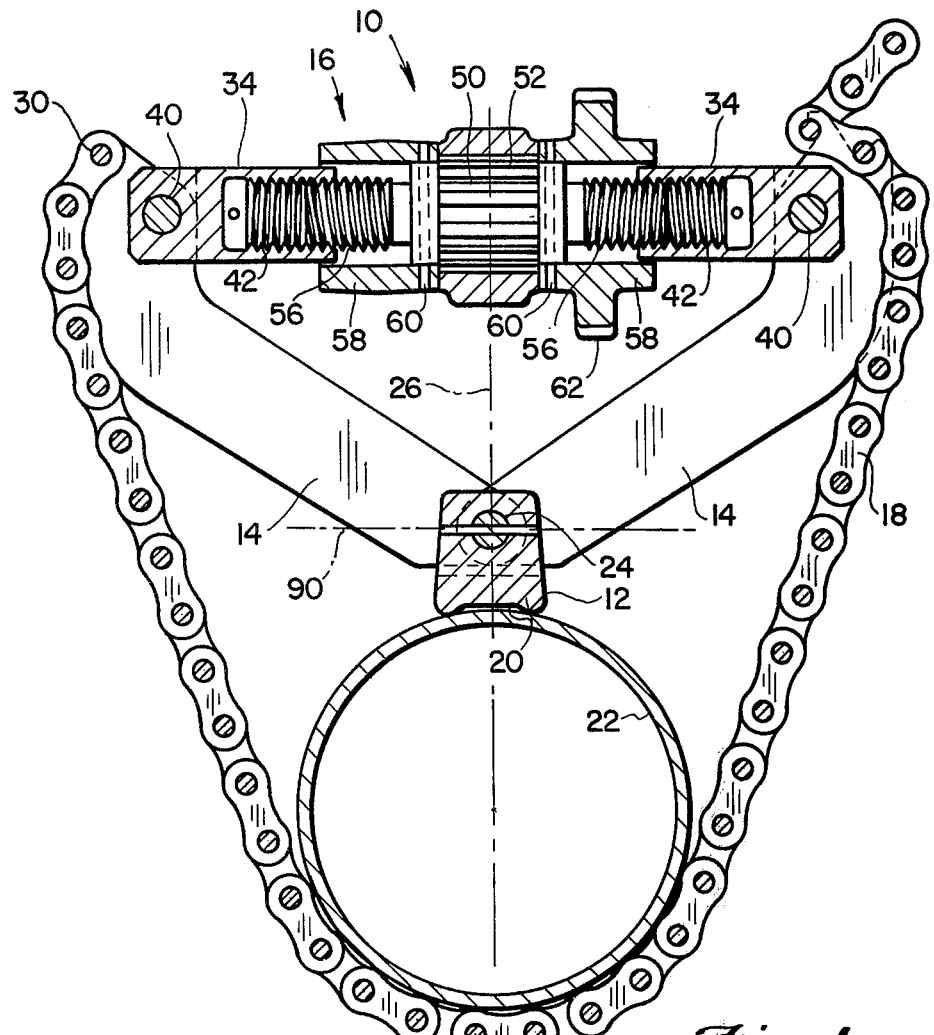

United States Patent [19]

Hagen et al.

[11] 4,011,979
[45] Mar. 15, 1977

[54] PORTABLE WELDING JIG

[75] Inventors: Paul Hagen, Thunder Bay; Lucien Delisle, St. Foy, both of Canada

[73] Assignee: Pelco Tools Limited, Markham, Canada

[22] Filed: Sept. 2, 1975

[21] Appl. No.: 609,378

[52] U.S. Cl. .................................. 228/49; 269/132
[51] Int. Cl.² ........................................ B23K 37/04
[58] Field of Search ............. 228/44.1, 44.5, 47, 228/49, 50, 57; 29/200 J, 200 P; 269/130, 131, 132

[56] References Cited

UNITED STATES PATENTS

| 2,158,218 | 5/1939 | Brouhon | 269/130 X |
| 3,292,922 | 12/1966 | Nastev | 269/131 |

*Primary Examiner*—Harold D. Whitehead
*Assistant Examiner*—K. J. Ramsey
*Attorney, Agent, or Firm*—Fetherstonhaugh & Co.

[57] ABSTRACT

A portable welding jig consisting of a pressure plate shaped to engage a minor peripheral portion of the circumference of a conduit, lever arm members pivotally mounted on the pressure plate and having their outer ends spaced from one another and disposed above the pressure plate, flexible conduit embracing means extending between the ends of the lever arm members to embrace a conduit and drive means disposed above the pressure plate and connecting the outer ends of the lever arms for moving the lever arms towards and away from one another to cause the flexible conduit embracing means to tighten against a conduit to drive the pressure plate radially inwardly to deflect the portion of the conduit engaged by the pressure plate radially inwardly to permit spot welding of the inwardly deflected portion of the conduit with respect to a second conduit.

7 Claims, 4 Drawing Figures

PORTABLE WELDING JIG

This invention relates to a portable welding jig. In particular this invention relates to a portable welding jig for use in the spot welding of sheet metal conduits.

In the installation of sheet metal conduits and ducts difficulty has been experienced in attempting to align the portions of conduits which are to be spot welded to one another. This difficulty exists when attempting to connect sheet metal conduits in an end to end relationship or in a relationship wherein one conduit is telescoped within another. Presently this alignment is achieved by manually aligning the conduits and this is a costly and time consuming operation requiring many man hours.

While a number of conduit embracing clamping devices have been provided which employ a flexible connector, none of these devices are specifically designed to permit a pressure plate to apply a localized pressure to a minor arcuate portion of the circumference of a conduit to deflect the portion of the conduit embraced thereby radially inwardly into alignment with the conduit which it is to be welded.

In a prior device which we developed, the pressure pad was mounted on a fixed base upon which a pair of slide members were mounted for movement towards and away from one another. A flexible conduit embracing member was connected at opposite ends to the slide members so that the ends of the flexible member were drawn together in order to effect a clamping action and to drive the pressure pad into engagement with the conduit. One of the difficulties with this structure was that the mechanism did not provide any significant mechanical advantage aiding in the application of the radially inwardly directed forces with respect to the conduit to which the pressure pad was applied. In fact the mechanical advantage derived from this prior mechanism decreased as the sliding heads were drawn together during the clamping action.

The present invention overcomes the difficulties of the prior art described above and provides an improved portable welding jig in which the mechanical advantage derived from the operation of the clamping unit increases as the lever arms are drawn towards one another to effect the application of a pressure by the pressure plate to a conduit in use.

According to an embodiment of the present invention there is provided a portable welding jig which comprises pressure plate means adapted to engage a minor peripheral portion of the circumference of a conduit, a pair of lever arm members each having an inner end and an outer end, the inner ends of the lever arms being pivotably mounted on said pressure plate and the outer ends of said lever arms being spaced from one another above said pressure plate, flexible conduit embracing means having opposite ends connected one to each outer end of said lever arms, said flexible conduit embracing means extending from said arms and below said pressure plate to embrace a conduit as required in use, drive means disposed above said pressure plate and connected to said outer ends of said lever arms, said drive means being operative to move said outer ends of said lever arms towards and away from one another by movement of said lever arms in an arc about their pivotal connection with said pressure plate, the movement of said lever arms towards and away from one other causing said flexible cable to tighten against a conduit and driving said pressure plate radially inwardly to deflect the conduit radially inwardly to permit spot welding of the inwardly deflected portions with respect to a second conduit.

Figure 2:
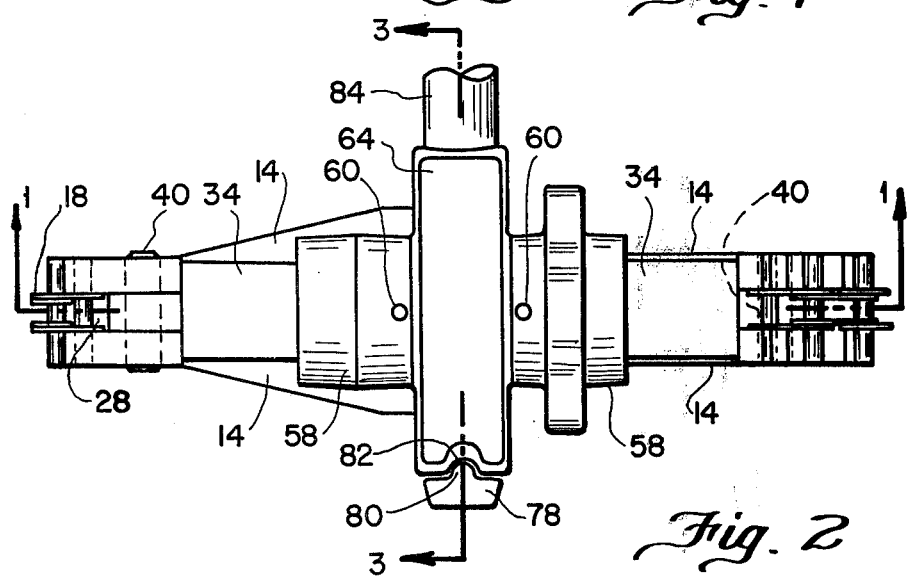
Figure 3:
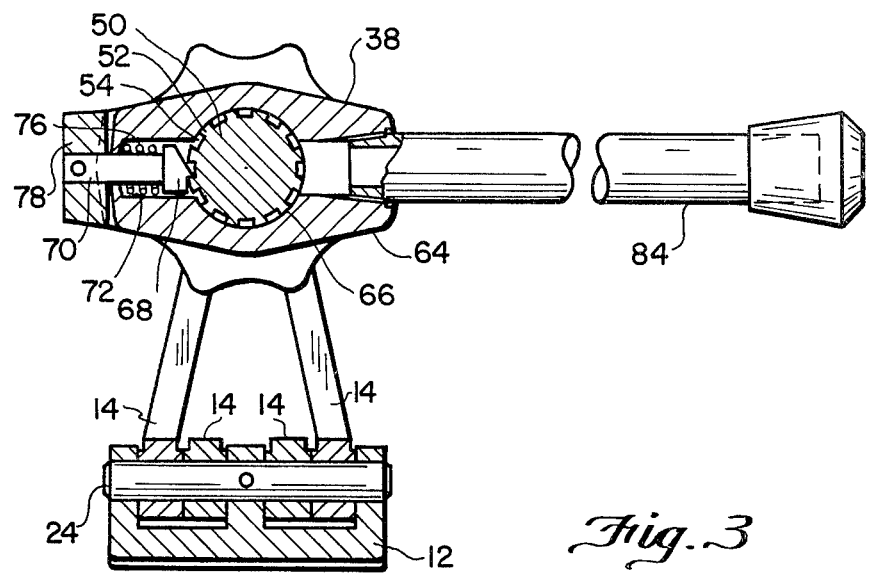
Figure 4:
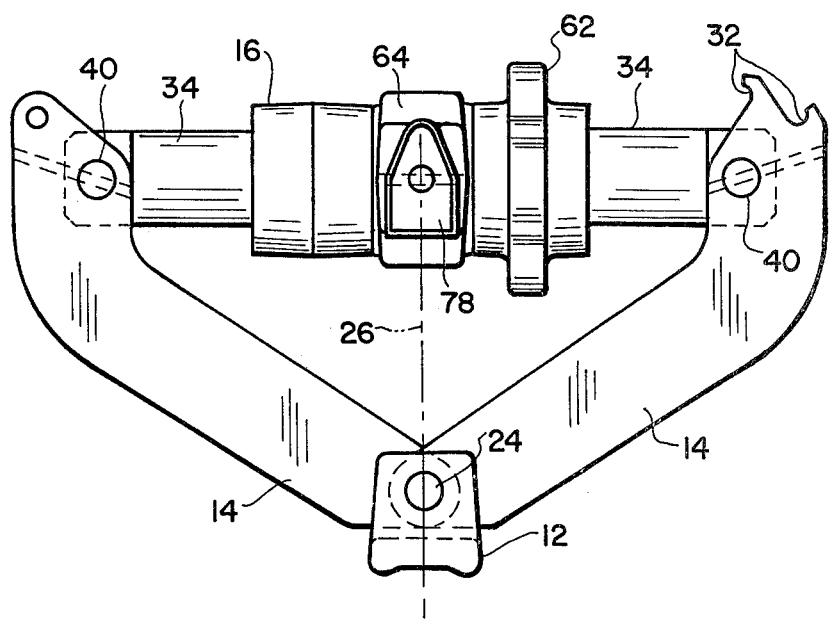

The invention will be more clearly understood after reference to the following detailed specification read in conjunction with the drawings wherein:

FIG. 1 is a partially sectioned front view of a welding jig according to an embodiment of the present invention, FIG. 2 is a plan view of the welding jig of FIG. 1, FIG. 3 is a sectional end view along the line 3—3 of FIG. 1, and FIG. 4 is a front view of the welding jig with the flexible conduit embracing chain removed.

As previously indicated the portable welding jig of the present invention is suitable for use in operably locating sheet metal conduits in a position suitable to permit spot welding of the conduits. The connection may be an end to end butt joint between conduits or it may be a connection formed by telescoping one end of one conduit within the end of another conduit in which case the welding jig of the present invention forces the outer conduit radially inwardly into engagement with the inner conduit.

The portable welding jig of the present invention is preferably made from tool steel or the like.

With reference to the drawings the reference numeral 10 refers generally to a portable welding jig according to an embodiment of the present invention. The jig consists of a pressure plate 12, a pair of lever arms 14, a turnbuckle assembly 16 and a flexible conduit embracing chain 18.

The pressure pad or plate 12 has a lower face 20 which is shaped to provide a pair of longitudinally extending ridges which engage a minor arc portion of the conduit 22 which is to be compressed in use. The inner ends of the lever arms 14 are pivotably mounted on a pivot pin 24 which is carried by the pressure plate 12. The arms 14 extend upwardly and radially outwardly from the pivotal direction with the pivot pin 24 and are equally angularly spaced about the central axis 26. The arms 14 are arranged in pairs with one pair extending outwardly on one side of the centre line 26 and the other pair extending outwardly on the other side of the centre line 26. The outer ends of each pair of arms are spaced apart to provide a passage 28 therebetween which is sufficiently wide to receive the length of the chain 18 therebetween. One end of the chain 18 is secured to the outer end of one pair of arms by means of the rivets 30 which extend through the eye of the chain link and passages 35 formed in the arms 14. The rivets 30 which connect the links of the chain project a substantial distance outwardly from the side face of the chain to provide a plurality of laterally extending mounting shafts which engage the hook-shaped recesses 32 at the outer end of the other pair of arms 14 as shown in FIGS. 1 and 2 of the drawings.

The drive mechanism for driving the lever arms 14 towards one another consists of a turnbuckle assembly 16. The turnbuckle assembly 16 includes a pair of coupling members 34 which are pivotally mounted at the outer ends of the arms 14 by means of a pivot pin 40. The ratchet assembly 38 consists of a central boss 50 which has a central portion formed with a plurality of longitudinally extending splines 52. A pair of threaded shafts extend outwardly from opposite ends of the central boss 50 and are threadably mounted in the threaded bores 42 of the coupling members 34. A pair of sleeves 58 are secured by pins 60 to opposite ends of the boss 50 and project outwardly therefrom in a position disposed radially outwardly from the shafts 56 to protect the threaded shafts 56. The sleeves 58 are adapted to fit in a close fitting relationship about the outer surface of the coupling member 34. A manually engageable flange 62 projects outwardly from one of the sleeves 58 to form a hand wheel which facilitates manual rotation of the central boss 50 which in turn causes rotation of the shafts 56 with respect to the coupling members 34 to cause the outer ends of the lever arms 14 to be driven towards or away from one another depending upon the direction of rotation of the flange 62. It will be noted that a left hand thread is used on one side of the turnbuckle and a right hand thread is used on the other side of the turnbuckle.

The ratchet 38 consists of a ratchet head 64 which has a central passage 66 adapted to fit in close fitting relationship about the external surface of the boss 50. A ratchet dog 68 is slidably mounted in a passage 72 formed in the head 64 and is urged in a direction towards the boss 50 by means of a spring 76. The dog 68 engages the longitudinal slots 54 formed in the boss 50. The dog 68 is connected to the adjustment handle 78 by means of shaft 70. The adjustment handle 78 has an arcuate shaped portion 80 at the inner end thereof adapted to fit within an arcuate shaped recess 82 formed on the outer face of the head 64. Rotation of the adjustment nut 78 through an angle of 180° reverses the direction of engagement of the dog 68 within the channel 54 so that the boss 50 may be driven in either direction as required in response to arcuate movement of the head 64. A handle 84 is threadably mounted in the head 64 and projects radially outwardly therefrom.

In use, the pressure plate 12 is located on the periphery of the conduit 22 and the chain 18 is extended about the conduit and the free end of the chain is mounted on the opposite arms 14 by engaging the lateral shafts or links 30 of the chain recesses 32. Clamping is effected by positioning the ratchet adjustment nut in the position to rotate the clamping nut in the required direction and thereafter operating the lever arm 84 to rotate the central boss 50 and shafts 56. As previously indicated, rotation of the shafts 56 in one direction causes the lever arms to move inwardly. The inward movement of the lever arms 14 causes a pressure to be applied to the conduit by means of the pressure plate 12. It will be noted that as the lever arms 14 move inwardly and pivot about the pivot pin 24, the outer end of the arms move upwardly and away from the horizontal plane 90 which extends through the pivot pin 24. Movement of the outer end of the arms away from the plane 90 provides an increased mechanical advantage as the lever arms 14 move towards the vertical position. The increase in mechanical advantage achieved by this structure is desirable because of the fact that it is achieved at the point where the load which is to be applied in deflecting the conduit increases due to the resistance of the conduit to the deflecting load.

These and other advantages of the present invention will be apparent to those skilled in the art without departing from the scope of the invention.

What we claim as our invention is:
1. A portable welding jig comprising
   a. pressure plate means shaped to engage a minor peripheral portion of the circumference of a conduit,
   b. a pair of lever arm members each having an inner end and an outer end, the inner ends of the lever arms being pivotably mounted on said pressure plate and the outer ends of said lever arms being spaced from one another above said pressure plate,
   c. flexible conduit embracing means having opposite ends connected to each outer end of said lever arms, said flexible conduit embracing means extending from said arms below said pressure plate and being adapted to embrace a conduit and extend tangentially upwardly therefrom to said outer ends of the lever arms,
   d. drive means disposed above said pressure plate and connected to said outer ends of said lever arms, said drive means being operative to move said outer ends of said lever arms towards and away from one another by movement of said arms in an arc about their pivotal connection with said pressure plate, the movement of said lever arms towards one another causing the flexible conduit embracing means to tighten against a conduit and driving the pressure plate radially inwardly to deflect the portion of the conduit engaged by the pressure plate radially inwardly to permit spot welding of the inwardly deflected portion with respect to a second conduit.

2. A portable welding jig as claimed in claim 1 wherein said lever arms are equally spaced and are equally angularly inclined with respect to a central plane extending vertically through said pivotal connection of said arms with respect to said pressure plate.

3. A portable welding jig as claimed in claim 1 wherein said drive means consists of a turnbuckle assembly comprising a pair of opposite hand threaded members connected centrally between the lever arms by means of a rotatable adjustment member having complementary opposite hand threaded means engaging said pair of threaded members to move said threaded members towards and away from one another in response to rotation of said rotatably adjustable member.

4. A portable welding jig as claimed in claim 3 including reversible ratchet lever mounted on said adjustment member and projecting radially therefrom for rotatably driving said adjustment member in response to repeated arcuate movement of said ratchet lever means.

5. A portable welding jig as claimed in claim 1 wherein said drive means consists of a turnbuckle assembly comprising a pair of coupling members having one end pivotably connected to an outer end of a lever arm and the other end formed to provide an internally threaded bore opening inwardly thereof, the thread bore of one coupling member being of an opposite hand to the thread of the bore of the other coupling member, an adjustment member having a central boss, a pair of externally threaded shafts projecting from said central boss and threadably engaging said bores of said coupling members, a pair of annular collars projecting from said boss and disposed radially outwardly of said threaded shafts, said collars being adapted to fit over said coupling members in a free fitting sliding relationship whereby the threaded portions of said turnbuckle assembly are enclosed and protected from damage.

6. A portable welding jig as claimed in claim 5 including manually engageable flange means projecting radially from said adjustment member for manual engagement to rotate said member to effect adjustment of said turnbuckle assembly.

7. A portable welding jig comprising
   a. pressure plate means shaped to engage the outer surface of a minor peripheral portion of the circumference of a conduit and to apply a load in a pressure plane extending radially inwardly of a conduit in use,
   b. a pair of lever arm members each having an inner end and an outer end, the inner ends of the lever arms being pivotably mounted on said pressure plate and the outer ends of said lever arms being spaced laterally from one another and disposed above and on opposite sides of said pressure plane of said pressure plate,
   c. flexible conduit embracing means having opposite ends connected to each outer end of said lever arms, said flexible conduit embracing means extending from said arms below said pressure plate and being adapted to embrace a peripheral portion of the circumference of a conduit and to extend tangentially upwardly therefrom to said outer ends of the lever arms,
   d. drive means disposed above said pressure plate and connected to said outer ends of said lever arms, said drive means being operative to move said outer ends of said lever arms towards and away from one another by movement of said arms in an arc about their pivotal connection with said pressure plate, the movement of said lever arms towards one another causing the flexible conduit embracing means to tighten against said portion of the circumference of the conduit and driving the pressure plate radially inwardly in said pressure plane to deflect the portion of the conduit engaged by the pressure plate radially inwardly to permit spot welding of the inwardly deflected portion with respect to a second conduit.

* * * * *